United States Patent [19]

Hikosaka et al.

[11] 4,080,945
[45] Mar. 28, 1978

[54] STRUCTURE OF V TYPE INTERNAL COMBUSTION ENGINE

[75] Inventors: Noboru Hikosaka, Kamakura; Isamu Yanagawa, Hiratsuka, both of Japan

[73] Assignee: Isuzu Motors Limited, Tokyo, Japan

[21] Appl. No.: 712,572

[22] Filed: Aug. 9, 1976

[30] Foreign Application Priority Data

Aug. 8, 1975 Japan .................................. 50-96348
Sep. 2, 1975 Japan ................................ 50-106207

[51] Int. Cl.² ............................................. F02F 7/00
[52] U.S. Cl. ........................... 123/195 C; 123/55 VS; 123/195 S; 123/198 E; 181/204
[58] Field of Search .......... 123/55 V, 55 VS, 55 VF, 123/55 VE, 52 MV, 139 AL, 139 AK, 195 C, 195 S, 198 E; 181/33 K

[56] References Cited

U.S. PATENT DOCUMENTS

| | | | |
|---|---|---|---|
| 2,927,565 | 3/1960 | Turner | 123/52 MV |
| 2,936,746 | 5/1960 | Rundquist | 123/52 MV |
| 3,783,845 | 1/1974 | Brandstetter | 123/52 MV |
| 3,884,201 | 5/1975 | Cregan | 123/52 MV |

OTHER PUBLICATIONS

Stinson; "Diesel Engineering Handbook," 11th edition, 1963; p. 328.

*Primary Examiner*—Charles J. Myhre
*Assistant Examiner*—Craig R. Feinberg
*Attorney, Agent, or Firm*—Sughrue, Rothwell, Mion, Zinn and Macpeak

[57] ABSTRACT

A construction for V type internal combustion engines having a pair of banks arranged in a V shaped form. An intake duct is composed of a metal sheet bottom portion and a metal sheet body formed with an intake passage both of which are coupled to each other. Partition walls are also provided on the front and rear end portions of the engine and coupled with the bottom portion of the intake duct so as to form a soundproofing chamber between the pair of banks.

1 Claim, 5 Drawing Figures

STRUCTURE OF V TYPE INTERNAL COMBUSTION ENGINE

BACKGROUND OF THE INVENTION

The invention relates to an V type internal combustion engine, and more particularly to the construction thereof in which an intake duct is disposed between a pair of banks.

It is the recent practice for eliminating engine noise problems to provide a so-called "envelopment" in which a soundproofing case is used to envelop the engine. The use of the "envelopment", however, disadvantageously causes the engine to have an increase in size and makes it difficult to check the engine components for maintenance. Also, increased temperature and pressure during operation are maintained within the soundproofing case and lead to engine overhead, causing the engine and the engine components to deteriorate.

SUMMARY OF THE INVENTION

It is a main object of the present invention to provide a V type internal combustion engine which has few components, is light, compact, inexpensive to produce, and high in sound-absorption performance and which is free from the above mentioned disadvantages found in the prior art engines.

Another object of the present invention is to provide a V type internal combustion engine in which the intake duct disposed between the pair of banks is used also as a cover for a soundproofing chamber.

A further object of the present invention is to provide a V type internal combustion engine in which the bottom portion of the intake duct rests on the partition walls disposed at the front and rear ends of the engine so as to form a soundproofing chamber for shutting off the sound from sound sources such as the fuel injection pump, thereby permitting an effective attenuation of the engine noise.

A still further object of the present invention is to provide an improved V type internal combustion engine in which the bottom portion of the intake duct is used not only for defining the soundproofing chamber with the partition walls but also for covering the valve tappet chamber. This permits the reduction of the number of required engine components.

BRIEF DESCRIPTION OF THE DRAWINGS

The present invention will be more fully understood and its objects and advantages further appreciated by referring now to the following detailed specification taken in conjunction with the drawings, in which.

DETAILED DESCRIPTION OF THE INVENTION

Figure 1:
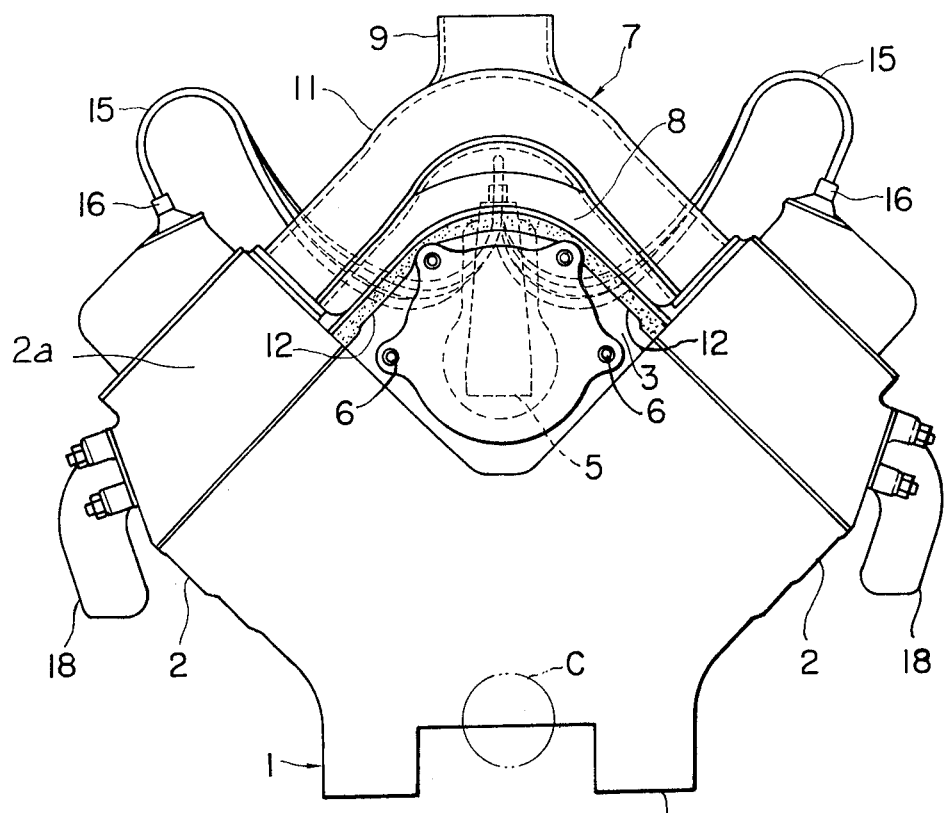
FIG. 1 is an elevational view of a V type internal combustion engine in accordance with one embodiment of the invention.
Figure 3:
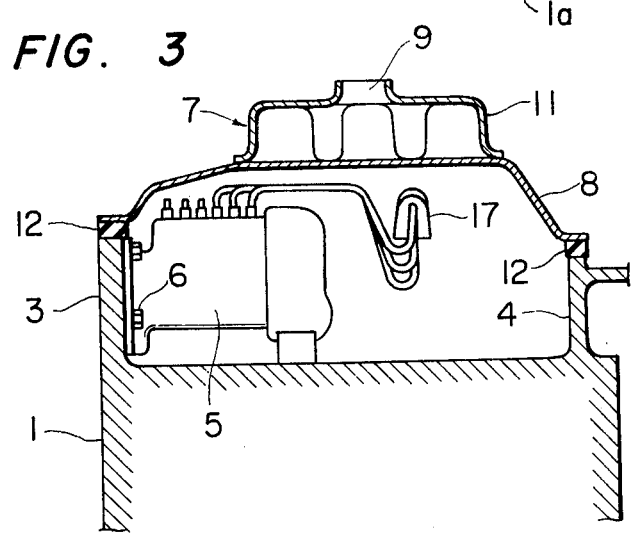
FIG. 3 is a partially sectional side elevation of the internal combustion engine of FIG. 1.
Figure 2:
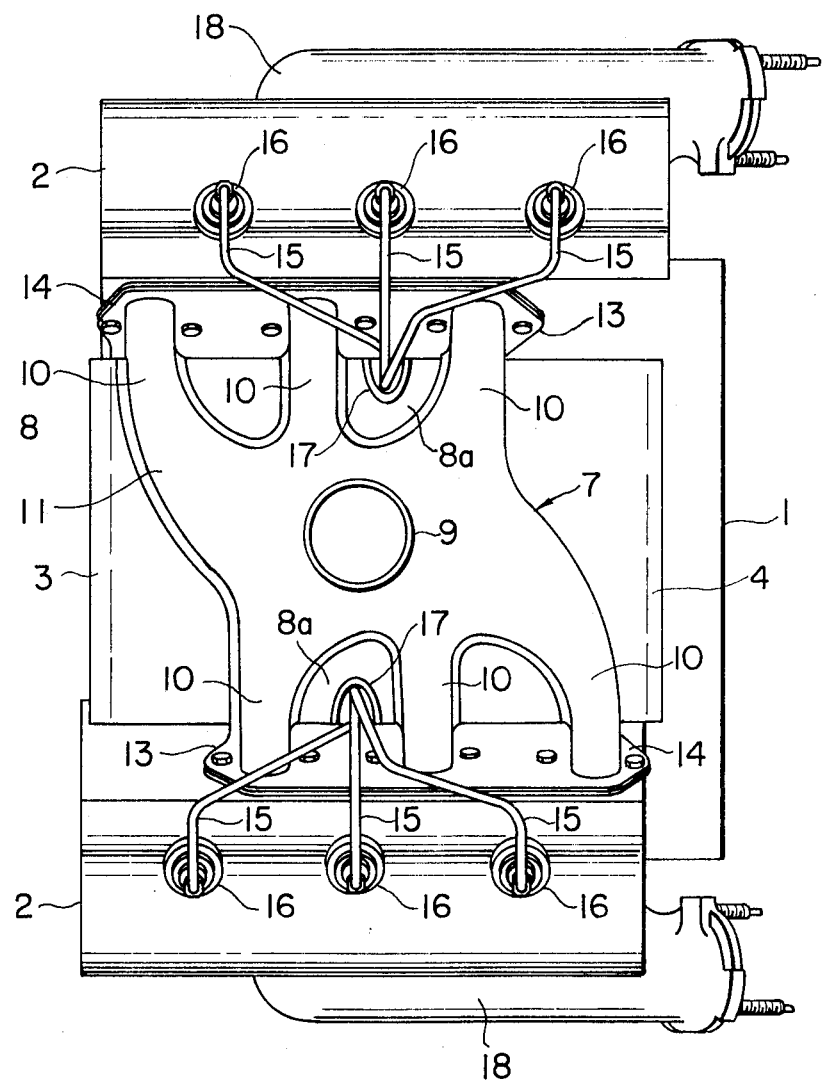
FIG. 2 is a top plan view of the V type internal combustion engine of FIG. 1.

Referring now to the drawings, and initially to FIGS. 1-3 thereof, there is illustrated a V type internal combustion engine in accordance with one embodiment of the present invention. The reference numeral 1 indicates a V type compression ignition internal combustion engine which has a pair of banks 2 arranged in a V shaped form and which is integrally equipped with substantially sector shaped partition walls 3 and 4 in the front and rear end portions so as to form a space between the pair of banks 2. Within the space a fuel injection pump 5 is secured by means of bolts 6 or the like. Also, provided between the pair of banks 2 is an intake duct 7 which is composed of a metal body 11 and a bottom portion 8 of a flat metal sheet, the body 11 and the bottom portion 8 being coupled by welding or the like. The body 11 is formed previously under pressing operations both with an intake tube 9 centrally located and extending upward for connection to an air cleaner, not shown, and with diverged pipes 10 forming branches identical in number to the cylinders of the engine 1 and extending to opposite sides. The bottom portion 8 rests on the partition walls 3 and 4 through suitable seal members 12 so as to cover the fuel injection pump 5 between the banks 2. The diverged pipes 10 of the body 11 have their ends welded to flanges 13 through which the body 11 is secured to the respective banks 2 by means of bolts 14 or the like. Also, the bottom portion 8 has its side portions tangent to the flanges 13 and is coupled through the side portions to the flanges 13 by seam welding or the like. Fuel pipes 15 extend upward from the fuel injection pump 5 through holes which are provided in areas 8a of the portion 8, each surrounded by adjacent diverged pipes 10 of the bottom portion between the diverged pipes 10 and each is connected to a nozzle 16 provided in the cylinder heads 2a of the respective banks 2. The reference numeral 17 indicates seal members each provided on the peripheries of the above mentioned hole.

An exhaust duct 18 is disposed outside the pair of banks 2 of the engine 1 and an oil tank, not shown, will be provided at the lower end 1a. The imaginary line c designates the position where the crank-shaft will be provided.

In the V type internal combustion engine having the above described construction, the bottom portion 8 of the intake duct 7 and the partition walls 3 and 4 are effective to shut off the operation sound from the fuel injection pump 5 and can reduce the engine sound to a minimum level. Further, since the intake duct 7 is made of metal sheets and its bottom portion 8 is used also as a soundproofing board for the fuel injection pump 5, the soundproofing construction of the invention has fewer components, and is light, compact, and inexpensive to produce. Also, by applying a sound-absorption metal board to the bottom portion, the radiative sound from the intake duct 7 can be eliminated and a more effective soundproofing construction can be provided.

Figure 4:
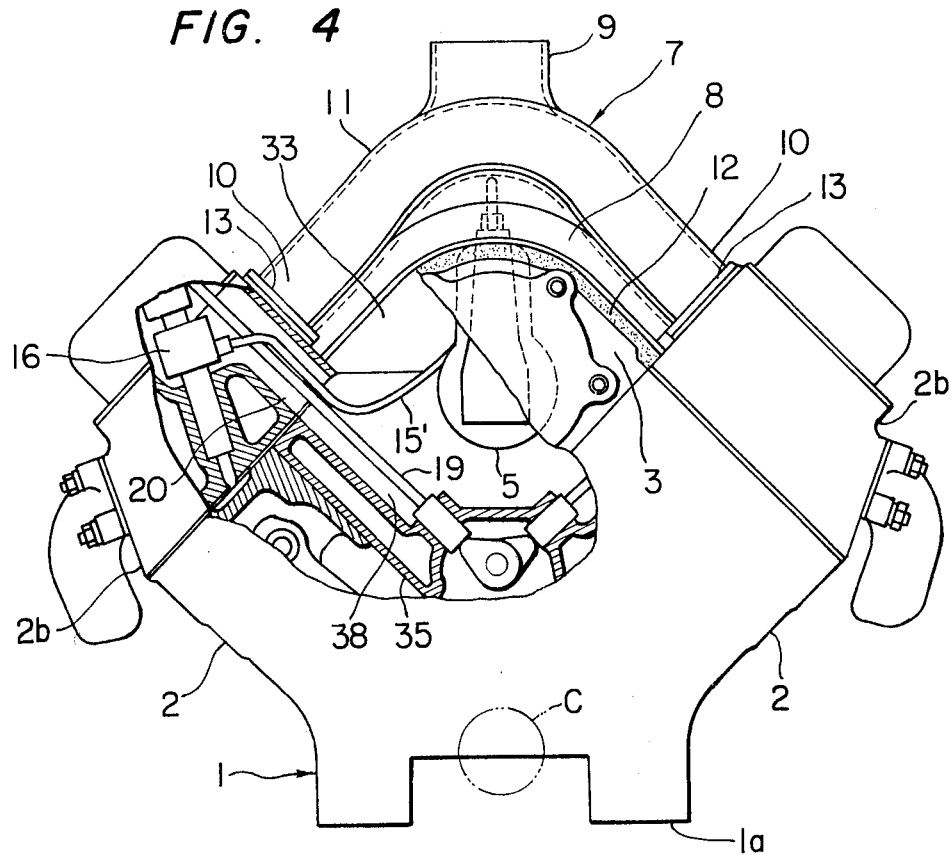
FIG. 4 is a partially sectional elevational view of the V type internal combustion engine in accordance with an alternative embodiment of this invention.
Figure 5:
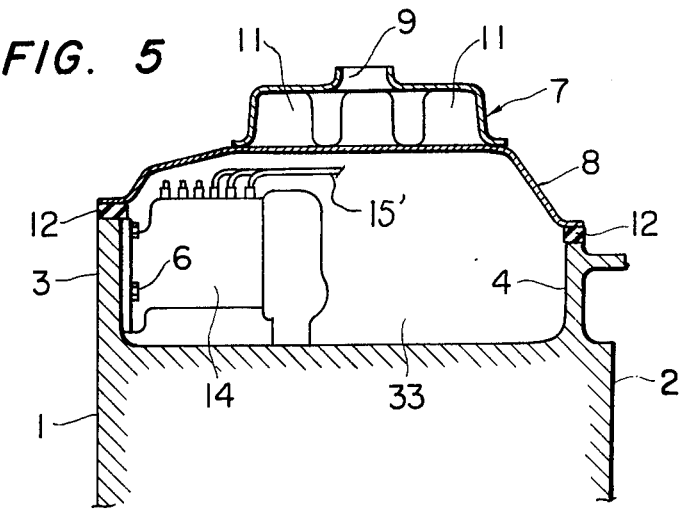
FIG. 5 is a partially sectional side elevation of the internal combustion engine of FIG. 4.

Referring now to FIGS. 4 and 5, there is shown another embodiment which is similar to the first embodiment except for the tappet chamber arrangement. Accordingly, like parts are designated by like reference numerals while similar parts having identical functions are designated by the same reference numeral followed by the suffix prime (').

The bottom portion or sheet 8 of the intake duct 7 rests on the partition walls 3 and 4 through suitable seal members 12 between the pair of banks 2 so as to cover the tappet chamber 38 and defines a soundproofing chamber 33. The bottom portion 8 also has its side portions tangent to the flange 13 and is coupled through the side portions to the flanges 13 by seam welding or the like.

The fuel injection pump 5 rests in the soundproofing chamber 33 and is secured therewithin by means of suitable supporting means 6 for supplying the fuel to the injection nozzles 16 disposed in the respective cylinders 35 upon rotation of the crank-shaft not shown. The fuel injection pump 5 and the fuel injection nozzles 16 are connected with each other through fuel pipes 15' each of which extends through the uncovered tappet chamber 38 and the hole 20 for the push rod 19 formed in the tappet chamber 38.

Accordingly, in the V type internal combustion engine as described in this embodiment, the soundproofing chamber 33 defined by the bottom portion 8 of the intake duct 7 and the partition walls 3 and 4 is also effective to shut the operation sound from the fuel injection pump 5 and can reduce the sound of the engine 1 to a minimum level. Furthermore, since the bottom portion 8 is used also for covering the tappet chamber 38 so as to eliminate the need for a tappet chamber cover, a compact engine construction of fewer components can be provided. Further, since the fuel pipes 15' from the fuel injection pump 5 to the injection nozzles 16 are so arranged as to extend through the tappet chamber 38 and the cylinder head 2b, the sound from the fuel pipes 15' themselves can be shut and a more effective soundproofing construction can be provided.

A highly important advantage of the invention is in the formation of a soundproofing chamber for receiving sound sources such as an fuel injection pump or the like so as to reduce the engine sound to a minimum level.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a V type internal combustion engine having a pair of banks arranged in a V shaped form, the improvement which comprises an intake duct composed of a bottom metal sheet portion and a metal sheet body formed with an intake passage, said body and said bottom metal sheet portion being coupled to each other such that the bottom portion covers the space between the pair of banks, partition walls provided on the front and rear end portions of said engine so as to form together with said bottom metal sheet portion and said V shaped banks, a soundproofing chamber, and a noise generating engine component mounted within said soundproofing chamber; further comprising tappet chambers covered by the bottom portion and said partition walls; and a fuel injection pump disposed within the soundproofing chamber and fuel pipes connecting the fuel injection pump and fuel injection nozzles disposed in the respective cylinder heads of the both banks, with said pipes extending through the tappet chambers and the cylinder heads.

* * * * *